(12) United States Patent
Edwards et al.

(10) Patent No.: US 7,872,775 B2
(45) Date of Patent: Jan. 18, 2011

(54) APPARATUS AND METHOD FOR A RESOLUTION QUALITY REDEFINITION CONTROL SYSTEM FOR A MULTI-FUNCTION DEVICE

(75) Inventors: Mark Joseph Edwards, Lexington, KY (US); Ronald Todd Sellers, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 2419 days.

(21) Appl. No.: 10/154,655

(22) Filed: May 24, 2002

(65) Prior Publication Data

US 2003/0218762 A1 Nov. 27, 2003

(51) Int. Cl.
G06K 15/02 (2006.01)
G06F 3/12 (2006.01)
H04N 1/46 (2006.01)
H04N 1/04 (2006.01)

(52) U.S. Cl. .................. 358/1.2; 358/1.1; 358/501; 358/474

(58) Field of Classification Search .............. 358/1.2, 358/1.1, 474, 505, 1.6, 1.9, 501, 401; 382/276, 382/299
See application file for complete search history.

(56) References Cited

U.S. PATENT DOCUMENTS

| | | | |
|---|---|---|---|
| 4,097,873 A | * | 6/1978 | Martin ........................ 347/3 |
| 4,631,598 A | | 12/1986 | Burkhardt et al. |
| 4,644,409 A | * | 2/1987 | Fuchs ....................... 358/443 |
| 4,782,399 A | * | 11/1988 | Sato ......................... 358/443 |
| 4,937,762 A | | 6/1990 | Todome |
| 5,107,344 A | | 4/1992 | Nosaki et al. |
| 5,218,457 A | | 6/1993 | Burkhardt et al. |
| 5,231,519 A | | 7/1993 | Koike |
| 5,239,389 A | | 8/1993 | Kochis et al. |
| 5,270,836 A | | 12/1993 | Kang |
| 5,293,254 A | | 3/1994 | Eschbach |
| 5,293,432 A | | 3/1994 | Gonser et al. |

(Continued)

FOREIGN PATENT DOCUMENTS

EP  0495433 A2  7/1992

(Continued)

Primary Examiner—Edward L Coles
Assistant Examiner—Thomas J Lett
(74) Attorney, Agent, or Firm—Ronald K. Aust; John Victor Pezdek

(57) ABSTRACT

A resolution quality redefinition control system for a multi function scanner/printer controls a plurality of functions executable such as scanning, printing, copying and faxing. Multiple resolution qualities may be selected by a user for any of the functions through a user input in communication with the controller. A designated quality resolution may not be appropriate for a designated function, however. Some of the functions have an optimal resolution and/or a significant range of resolutions. When the designated quality resolution is not appropriate for a designated function, the controller re-defines the designated quality resolution as an execute resolution for each execution of one of the functions. The execute resolution may be a higher one of the multiple designatable resolutions when the designated resolution is below the optimal resolution but within said significant range, may be a lower of the multiple designatable resolutions when the designated resolution is above the optimal resolution but within said significant range, may be a maximum resolution, may be a minimum resolution or may be a single optimal resolution.

19 Claims, 5 Drawing Sheets

U.S. PATENT DOCUMENTS

| | | | |
|---|---|---|---|
| 5,361,134 A | 11/1994 | Hu et al. | |
| 5,430,524 A | 7/1995 | Nelson | |
| 5,521,715 A | 5/1996 | Verhaag et al. | |
| 5,574,563 A | 11/1996 | Hayashi et al. | |
| D377,370 S | 1/1997 | Escobedo et al. | |
| 5,617,224 A | 4/1997 | Ichikawa et al. | |
| 5,642,207 A | 6/1997 | Smitt | |
| 5,650,857 A | 7/1997 | Cole et al. | |
| 5,706,045 A | 1/1998 | Inoue | |
| 5,708,512 A | 1/1998 | Ishizuka | |
| 5,742,708 A | 4/1998 | Yeh et al. | |
| D398,632 S | 9/1998 | Dodge et al. | |
| 5,819,010 A | 10/1998 | Uchiyama et al. | |
| 5,832,338 A * | 11/1998 | Kuga | 399/82 |
| 5,867,611 A | 2/1999 | Kanda | |
| 5,999,175 A | 12/1999 | Nalder | |
| 6,130,966 A | 10/2000 | Sekine et al. | |
| 6,160,249 A | 12/2000 | Webb et al. | |
| 6,471,325 B2 * | 10/2002 | Abe | 347/19 |
| 6,483,609 B1 * | 11/2002 | Ueno et al. | 358/434 |
| 6,616,259 B2 * | 9/2003 | Sasayama | 347/15 |
| 2001/0000979 A1 * | 5/2001 | Han et al. | 358/474 |
| 2002/0167690 A1 * | 11/2002 | Fujii et al. | 358/539 |
| 2003/0048487 A1 * | 3/2003 | Johnston et al. | 358/474 |
| 2003/0058487 A1 * | 3/2003 | Lay | 358/506 |
| 2004/0196509 A1 * | 10/2004 | Cousins et al. | 358/474 |
| 2006/0173990 A1 * | 8/2006 | Kitada et al. | 709/223 |

FOREIGN PATENT DOCUMENTS

| | | | |
|---|---|---|---|
| JP | 04320863 A | * | 11/1992 |
| JP | 08223410 A | * | 8/1996 |
| JP | 2002264403 A | * | 9/2002 |

* cited by examiner

FIG. 2

TABLE 1: TYPICAL SCAN AND PRINT RESOLUTIONS FOR EACH QUALITY MODE

| NORMAL QUALITY | | BETTER QUALITY | | BEST QUALITY | |
|---|---|---|---|---|---|
| SCAN RESOLUTION | PRINT RESOLUTION | SCAN RESOLUTION | PRINT RESOLUTION | SCAN RESOLUTION | PRINT RESOLUTION |
| 600x300 | 600x1200 | 600x600 | 1200x1200 | 600x1200 | 2400x1200 |

FIG. 3
*(PRIOR ART)*

TABLE 2: TRADITIONAL AIO SCAN/PRINT OPERATIONS AND RESOLUTIONS

| SCAN/PRINT OPERATION | NORMAL QUALITY | | BETTER QUALITY | | BEST QUALITY | |
|---|---|---|---|---|---|---|
| | SCAN RESOLUTION | PRINT RESOLUTION | SCAN RESOLUTION | PRINT RESOLUTION | SCAN RESOLUTION | PRINT RESOLUTION |
| BLACK/WHITE COPY | 600x300 | 600x1200 | 600x600 | 1200x1200 | 600x1200 | 2400x1200 |
| COLOR COPY | 600x300 | 600x1200 | 600x600 | 1200x1200 | 600x1200 | 2400x1200 |
| PHOTOGRAPH COPY | 600x300 | 600x1200 | 600x600 | 1200x1200 | 600x1200 | 2400x1200 |
| FAX | 600x300 | n/a | 600x600 | n/a | 600x1200 | n/a |
| SCAN-TO-FILE | 600x300 | n/a | 600x600 | n/a | 600x1200 | n/a |
| SCAN-TO-EMAIL | 600x300 | n/a | 600x600 | n/a | 600x1200 | n/a |

AIO BASIC BLOCK DIAGRAM

APPARATUS AND METHOD FOR A RESOLUTION QUALITY REDEFINITION CONTROL SYSTEM FOR A MULTI-FUNCTION DEVICE

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to control systems and data structures for multifunction computer peripheral devices such as scanners and printers and, more particularly, to redefining resolution qualities for various scanning and printing functions.

2. Related Art

Computer peripheral devices that combine functions such as scanning, printing and faxing are becoming increasingly popular in the marketplace. Building a single device that can perform scan, print, copy, and/or fax functions according to pre-existing standards for those operations presents a variety of control system programming challenges. One of these challenges is resolution quality control.

Control systems for varying resolution quality in single function devices are known. For example, a control system for an inkjet printer that selectively prints different resolutions is disclosed in U.S. Pat. No. 4,097,873 to Martin. A control system for varying scanner resolutions is disclosed in U.S. Pat. No. 6,160,249 to Webb, et al. A control system for converting facsimile image transmissions is disclosed in U.S. Pat. No. 6,130,966 to Sekine, et al. These control systems do not disclose varying resolution quality for multi-function devices.

Multi-function computer peripherals that already exist in the market place typically offer a user the desirable option of selecting a resolution quality by inputting a designated resolution quality which the user selects from among a variety of resolution quality options. Typically each selectable resolution is associated with a scan resolution and a print resolution. Both scan resolutions and print resolutions are defined by a predetermined number of dots per inch (dpi) in both the horizontal and vertical directions.

Integrated multi-function computer peripherals by definition offer two or more of a plurality of functions which may include black and white copying, color copying, photograph quality copying, faxing, scanning to files and scanning to e-mail. An operation panel allows a user to input a function designation from among two or more of these choices.

As with all computing devices, there is a continuing need for increasing efficiency by increasing speed, decreasing memory space required and decreasing the possibility of unacceptable output. For each imaging function, there are more efficient resolutions and less efficient resolutions. For at least some functions there are resolution limits beyond which unacceptable results will be output. For most functions, there is a range of resolutions that will output acceptable results. However, within these acceptable ranges, there remains a variance between more efficient resolutions and less efficient resolutions. For some functions, there are optimal resolutions.

Inefficiencies arise with multi-function devices when a user inputs a designated resolution which is not an efficient resolution for a user input designated function. For example, fax modems do not support a resolution higher than 150 dpi. If a user has input a designated resolution higher than 150 dpi and also input a designated function as faxing, execution of the operation will be unnecessarily slowed and memory demand will be unnecessarily increased by scanning the image at any range above 150 dpi.

Similarly, if the user inputs a high designated resolution of 600 by 1200 dpi for scanning and 2400 by 1200 dpi for printing, and thereafter inputs black and white copying as the designated function, there will be an inefficient slowing of scanner time and increase in memory space used over and above the maximum resolution supportable for black and white copying. Hence, there is a need in the multi-function computer peripheral control system arts for a control system that will redefine quality resolution to a lower resolution for functions such as faxing and black and white copying when a user has inappropriately or inadvertently designated an unsupportably high resolution quality.

Increasing efficiency is not limited to decreasing resolutions. For example, if a user has input as a designated function photograph quality copying, but has neglected to input the highest resolution quality as the designated resolution, a photograph may be both scanned and printed at a resolution too low to yield an acceptable copy. The scan and copy function would then need to be executed a second time, which is inefficient for the user. Accordingly, there is a need for a control system that will increase the resolution that is executed for a high resolution designated function, when a low quality has been input as the designated resolution.

Generally, there is a need in the multi-function computer peripheral arts for a control system that compares a user input designated resolution for a user input designated function to a range of resolutions efficient for that function and redefines the resolution to be executed with that function where appropriate. Where a user has input a designated resolution that is outside the limit of efficient resolutions for a designated function, there is a need for a control system that will redefine the resolution to be executed within acceptable limits. Where a user has input a designated resolution that is within a range of acceptable resolutions for a designated function, but nevertheless is not an optimal resolution, there is a need for a control system that will redefine the resolution at which the function is to be executed at a more efficient resolution than that designated by the user.

SUMMARY OF THE INVENTION

It is in view of the above problems that the present invention was developed. The invention is a resolution quality redefinition control system for a multi-function computer peripheral combining two or more functions which may include black and white copying, color copying, photograph quality copying, faxing, scanning to files and scanning to e-mail.

The resolution quality redefinition control system of the present invention is preferably embodied in firmware programmed into an application specific integrated chip (ASIC). It may also be embodied in dedicated logic components or software. The ASIC chip embodying the control system may be hard wired into the multi-function device, which is preferred, or embodied in a modular card. In either case, in operation, the control system is in operative communication with a scanner engine to control a scanner, and with a printer engine to control a printer. In the preferred embodiment, a single unit houses both the scanner and printer. The ASIC control system, or "controller," is also in operative communication with a user input panel. The user input panel will have means for a user to designate one of the listed functions as the function for the device to execute. The user input panel will also have means for a user to designate a resolution at which the designated function is to be executed. The user input panel may be embodied by a menu on an LCD, a series of buttons on the multi-function device, a software program displaying a graphical user interface on the screen of the computer in communication with the controller, or any combination of these. An LCD displaying designations in combination with buttons for inputting designations is preferred.

The controller also has a communications port for establishing operative communication with a host computer. Preferably, this communications port would embody not only communications for the purpose of scanning to files or scanning to email, but also communications with a fax modem. Optionally, a separate port may connect with a fax modem, or a fax modem may be incorporated into the multi-function device. Optionally, additional communication ports or busses may be linked with the controller.

The controller is also in operative communication with an image memory, preferably an SDRAM.

The resolution quality redefinition control system of the present invention incorporates a data structure defining an execute resolution for each combination of designated function with designated resolution input by the user. For each designated function received as a user input by the control system, the control system calls up the designated resolution input by the user. For each such designated resolution under each such designated function, an execute resolution for scanning and (where appropriate) for printing is defined. The designated function is executed at the quality resolution defined as the execute resolution. In some circumstances, the quality redefinition control system of the present invention will redefine the resolution from the user input designated resolution to a lower execute resolution, or to a higher execute resolution. In appropriate circumstances, the control system will not change the designated resolution.

In some circumstances the apparatus for the designated function cannot support resolutions in the selectable range. In such circumstances the control system will redefine the designated resolution to an execute resolution that is the maximum or minimum resolution that the multi-function device can execute. For example, fax modems cannot support greater than a 150 dpi resolution. Where a user has designated a fax as the designated function but also designated the best quality resolution, the scan quality will be redefined from the designated resolution of 600 dpi by 1200 dpi to the bottom limit of scan resolution, for example 300 dpi by 300 dpi.

In some circumstances the control system will increase the resolution. For example, where the user has input a designated function of photograph quality copying but also input a low quality as a designated resolution, control system will redefine the low quality resolution, for example 600 dpi by 300 dpi scanning and 600 dpi by 1200 dpi printing, to a higher resolution, such as 600 dpi by 600 dpi scanning and 1200 dpi by 1200 dpi printing.

In some circumstances the control system redefinition may represent moving the resolution to a resolution limit, for example, moving to a scanner bottom limit resolution of 300 dpi for a fax. In other circumstances, the control system may move within a range of acceptable resolutions from a less efficient designated resolution to a more efficient resolution that is closer to an optimal resolution. For example, if a user has input photograph quality copying as the designated function, the optimal resolution would be the maximum capability of the scanner, for example 600 dpi by 1200 dpi scanning and 2400 dpi by 1200 dpi printing. However, if the user has selected a lower than optimal quality, the control system of the present invention does not redefine the execute resolution at the optimal resolution, but rather defines the execute resolution at a level between the inefficient low designated resolution, and the optimal maximum resolution limit. Accordingly, in the photograph quality copy example, the low resolution quality of 600 dpi by 300 dpi scanning and 600 dpi by 1200 dpi printing is not raised to the optimal scanner maximum of 600 dpi by 1200 dpi and 2400 dpi by 1200 printing, but rather is increased an incremental, but submaximum amount to yield an intermediate execute resolution of 600 dpi by 600 dpi scanning and 1200 dpi by 1200 dpi printing. Thus efficiency is increased while maintaining a meaningful degree of choices for the user.

The resolution quality redefinition control system of the present invention may operate upon any of the above listed functions, upon other imaging functions, and upon any combination of imaging functions.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 2 is a resolution quality option table.

FIG. 3 is a table of resolution quality options listed with function options.

DETAILED DESCRIPTION OF THE PREFERRED EMBODIMENTS

Figure 1:
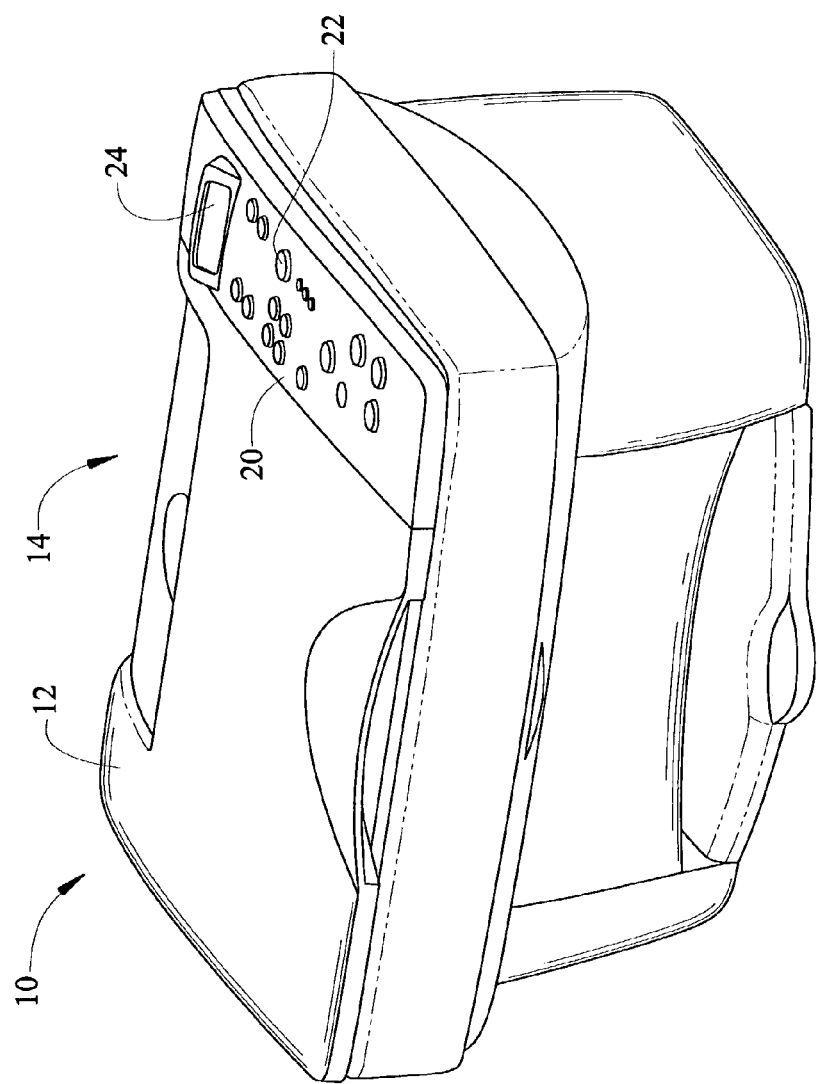
FIG. 1 is a perspective view of the multi-function device.

Referring to the accompanying drawings in which like reference numbers indicate like elements, FIG. 1 illustrates an example of a multi-function computer peripheral device combining scanning and printing functions. Multi-function device 10 has a lid 12 shown in its closed position. Under lid 12 is a flatbed scanner. Paper for printing may be input at 14.

The top of lid 12 has a control panel 20 having a variety of buttons 22 for initiating and controlling operations. Buttons 22 include controls such as power, cancel, fax, scan, reduce/enlarge, number of copies, etc. Menu, select, right and left arrow buttons interact with a display of menu selections on LED 24 to guide a user through further selection options. Either through buttons or the LED menu, these options include function designation such as fax, scan to file, scan to e-mail, photograph quality copying, color copying and black and white copying. The menu displayed on the LED in combination with the buttons allow a user to designate resolution quality options as well.

FIG. 2 is a resolution quality table depicting a typical range of options and the typical resolution qualities associated with those options. A low or "normal" resolution quality may typically be assigned in conventional multi-function devices to have a scan resolution of 600 dpi by 300 dpi and a print resolution of 600 dpi by 1200 dpi. In each case, the first number represents dots per inch in a horizontal direction, and the second number represents dots per inch in a vertical direction. An intermediate quality, labeled "better quality" in FIG. 2, scans at 600 dpi by 600 dpi and prints at 1200 dpi by 1200 dpi. A highest or "best" resolution quality may be assigned a typical value in the range of 600 dpi by 1200 dpi scan resolution and 2400 dpi by 1200 dpi print resolution. Clearly, a varying number of options may be presented to the user for resolution quality designation choices. The particular dpi values associated with each resolution quality option in the depicted table are typical but merely illustrative; other values may be used without departing from the scope of the present invention. For example, a fourth quick or test scan resolution quality of even lower resolution is often presented as an option.

FIG. 3 is a table of the resolution quality selections available according to the table in FIG. 2, as they would be applied in each of six possible functions: black and white copying, color copying, photograph quality copying, faxing, scanning to file, and scanning to e-mail. These are the inefficient execute resolutions for a multi-function device that does not have the resolution quality redefinition control system of the present invention.

Figure 4:
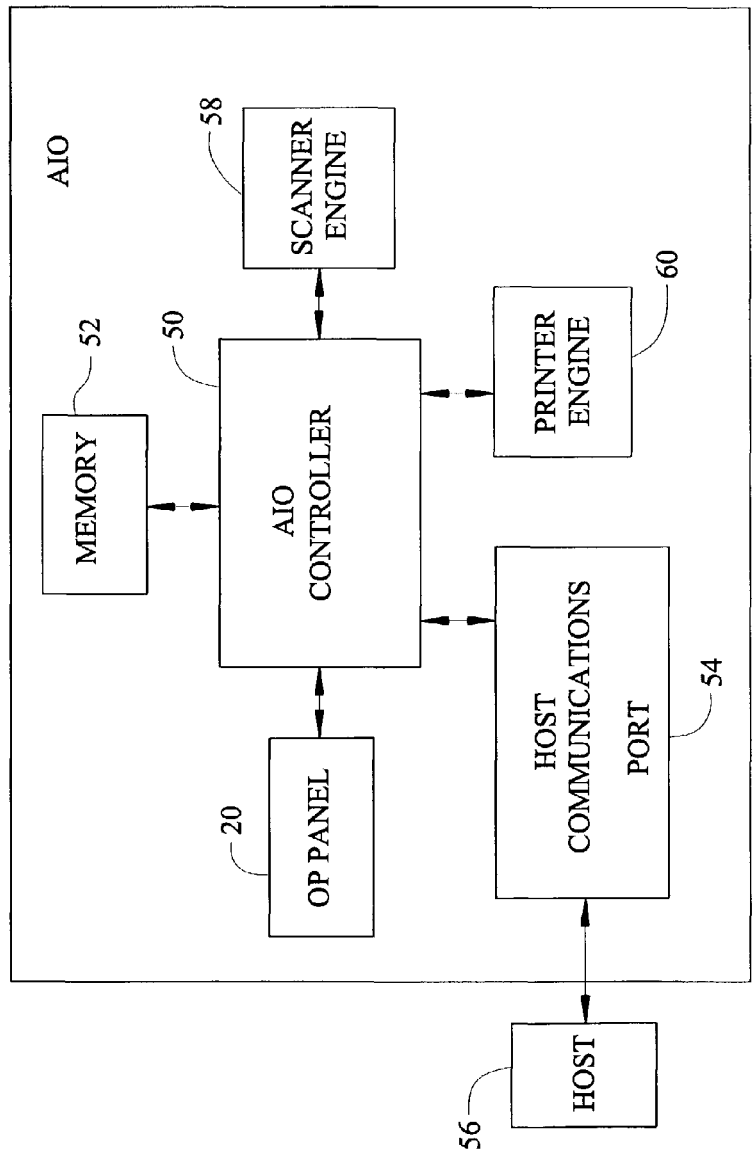
FIG. 4 is a block diagram of the resolution quality redefinition control system.

FIG. 4 is a block diagram of the resolution quality redefinition control system. A controller 50 is in operative communication with a memory, preferably an SDRAM 52. Image data is stored in this memory. The controller is also in operative communication with the control panel 20. A communication port 54 puts the multifunction device controller 50 in communication with a host computer 56. Controller 50 is also in operative communication with the scanner engine 58 and printer engine 60. As will be recognized by those of skill in the art, although the resolution quality control system is applied in its preferred embodiment in a multi-function device, the control system is easily applicable to separate peripherals, i.e. a separate scanner and a separate printer, without departing from the scope of the present invention.

Figure 5:
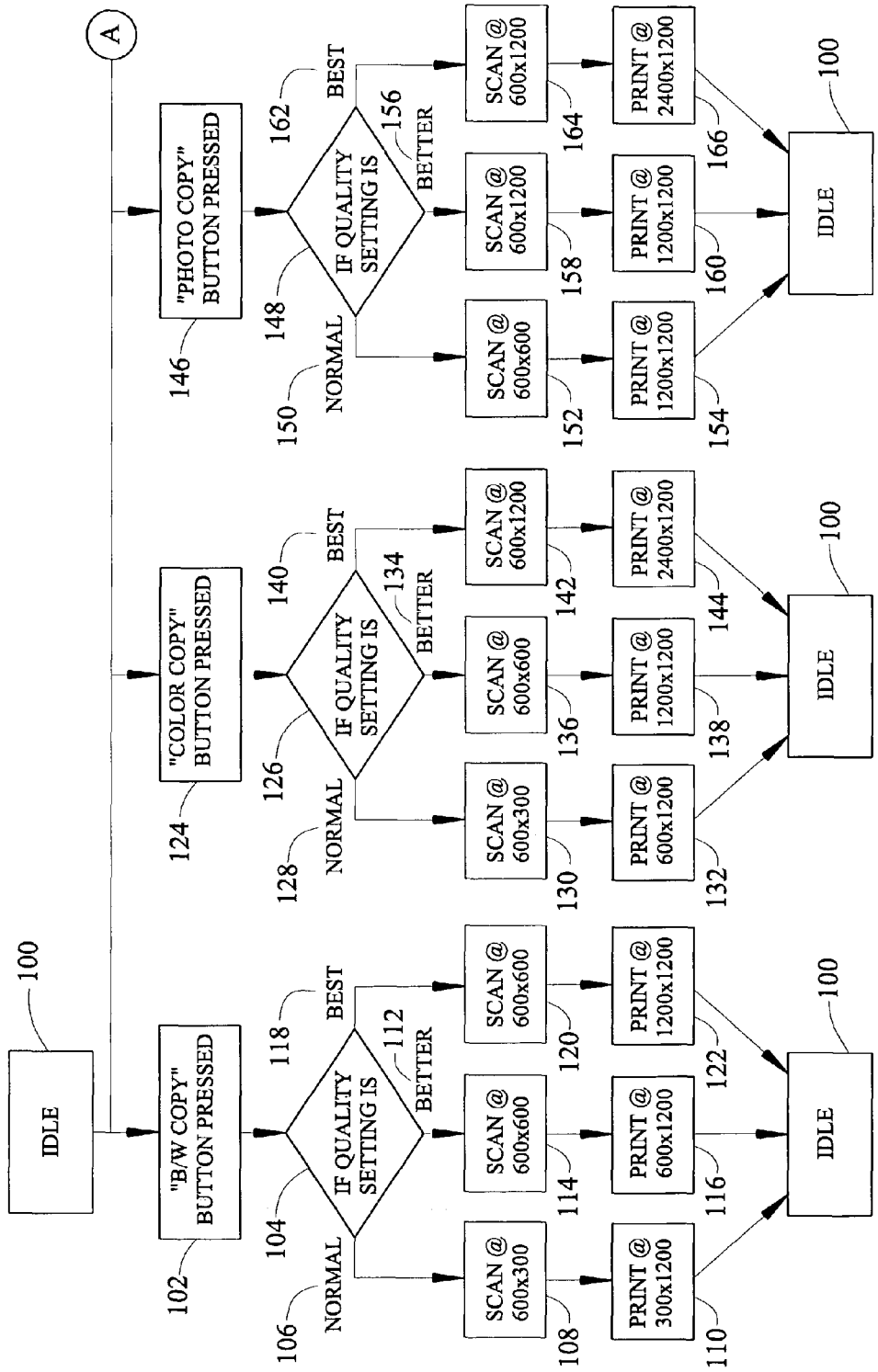
FIG. 5 and FIG. 6 are a flow chart of the control system for resolution quality redefinition.
Figure 6:
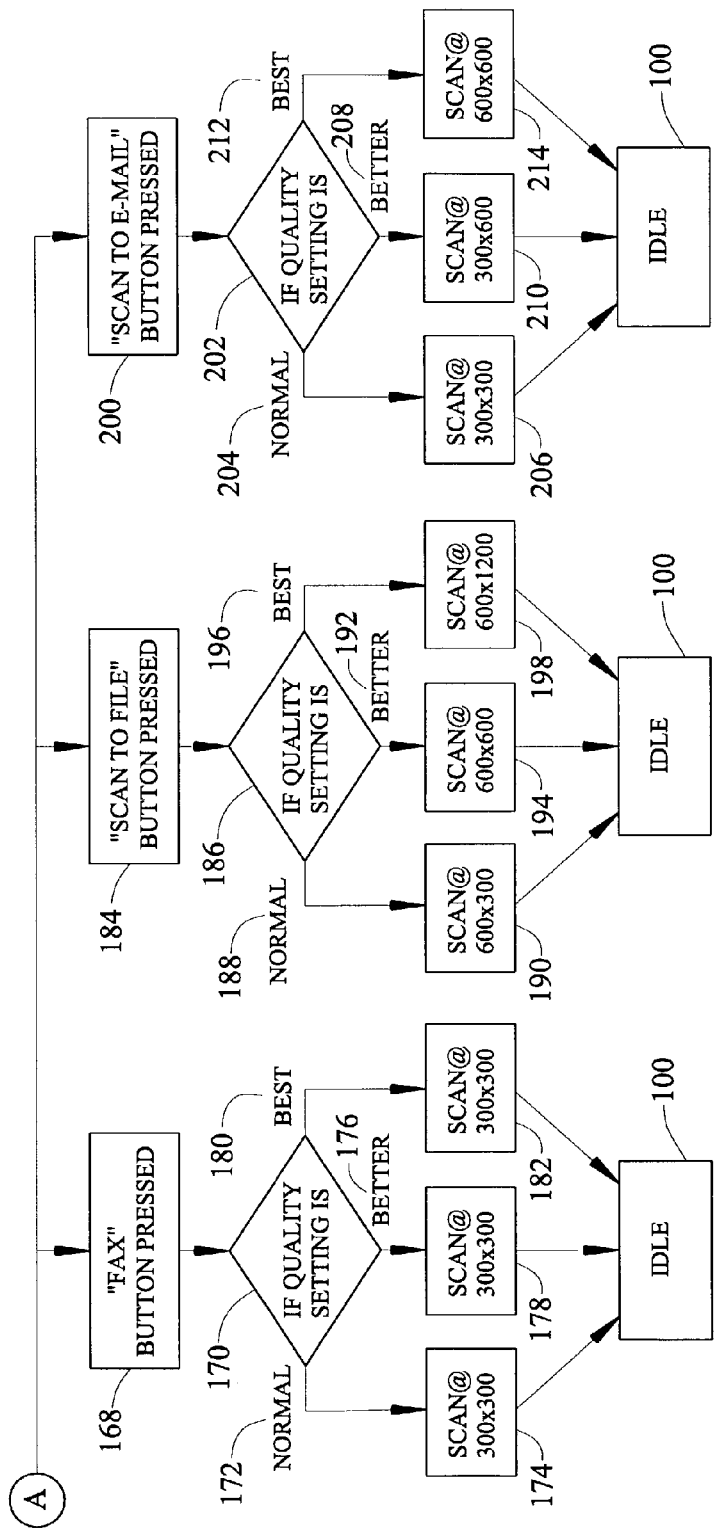

FIG. 5 and FIG. 6 are a flow chart illustrating the operation of the control system. Boxes 100 represent the non-operating neutral or "idle" position of the multi-function unit after a user has input a designated resolution.

Box 102 represents a user input of black and white copying as a designated function. Diamond 104 represents the control system determining the user input designated resolution. If the designated resolution is a low level, here designated "normal" 106, the control system proceeds to a predetermined execute scan resolution programmed to be appropriate for "normal" quality resolution for black and white copying. This scan resolution is 600 horizontal dpi by 300 vertical dpi 108.

Obviously, when any copying function is the designated function, a second step of printing will be executed. When "normal" resolution is designated for black and white copying, the predetermined print resolution is 300 dpi by 1200 dpi, 110.

If at diamond 104 the control system determines that the user has input a designated resolution at an intermediate quality, here designated "better" 112, the control system assigns a predetermined execute scan resolution of 600 dpi by 600 dpi, 114, and assigns a predetermined execute print resolution of 600 dpi by 1200 dpi, 116.

If at diamond 104 the control system determines that a user has input a designated resolution quality at a high level, here designated "best" 118, the control system assigns an execute scan resolution of 600 dpi by 600 dpi, 120. The control system then proceeds to assign a print resolution of 1200 dpi by 1200 dpi, 122.

Execute boxes 108, 110, 114, 116, 120 and 122 include sending an execute signal to the scanner engine and then the printer engine at the execute resolutions indicated. After both functions have executed, the control system and multi-function device return to idle 100.

If the user inputs a designated function of color copying 124 the control system next determines the user input designated resolution 126. If the designated resolution is normal 128 the control system assigns a scan resolution of 600 dpi by 600 dpi 130 and signals the scanner engine to execute at that resolution. Thereafter the control system assigns a print resolution of 600 dpi by 1200 dpi and sends a signal to the printer engine to execute at that resolution 132. Thereafter the control system and multi-function device return to idle.

If under a color copying function the control system determines that the user has input a designated resolution at the better quality 134 the control system assigns and executes scan resolution of 600 dpi by 600 dpi and sends a signal to the scanner engine to execute scanning at that resolution 136. Thereafter the control system assigns an execute print resolution of 1200 dpi by 1200 dpi and sends a signal to the printer engine to execute at that resolution 138.

If, under the designated function of color copying, the control system determines that a user has input a designated function at the best quality level 140 the control system assigns a scan resolution of 600 dpi by 1200 dpi and sends a signal to the scanner engine to execute at that resolution 142. Thereafter the control system assigns an execute print resolution of 2400 dpi by 1200 dpi and signals the printer engine to execute at that resolution 144. After one of these execute tracks has been completed, the control system and multi-function device return to idle 100.

If a user inputs a designated function as photograph quality copying 146 the control system determines the designated resolution 148. If the user has input a designated resolution at the normal quality level 150 the control system assigns a scan resolution of 600 dpi by 600 dpi and signals the scanner engine to execute at that resolution 152. Thereafter the control system assigns an execute print resolution of 1200 dpi by 1200 dpi and signals the printer engine to execute at that resolution 154.

If under photograph quality copying the control system determines that the designated resolution is at the intermediate "better" level 156 the control system assigns a scan execute resolution of 600 dpi by 1200 dpi and signals the scanner to execute at that resolution 158. Thereafter the control system assigns an execute print resolution at 1200 dpi by 1200 dpi and signals the printer engine to execute at that resolution 160.

If under photograph quality copying as the designated function the control system determines that the designated resolution is the high, "best" level resolution 162, the control system assigns an execute scan resolution of 600 dpi by 1200 dpi and signals a scanner engine to execute at that resolution 164. Thereafter the control system assigns an execute print resolution of 2400 dpi by 1200 dpi and signals the printer engine to execute at that resolution 166. After one of these control paths has been completed, the control system and multi-function device return to idle 100.

If a user inputs a designated function as faxing 168 the control system determines the designated resolution 170. If the user input designated resolution is the lower "normal" level 172 the control system assigns an execute scan resolution of 300 dpi by 300 dpi and signals the scanner engine to scan at that resolution 174. Since sending a fax requires no printing, an assignment of print execute resolution is unnecessary for the fax, scan to file and scan to e-mail functions. After executing the scan the control system and multi-function device return to idle 100.

If after designation of the fax function the control system determines that the intermediate "better" level is the designated quality resolution 176, the control system assigns an execute scan resolution of 300 dpi by 300 dpi and signals the scanner engine to execute at that resolution 178. If the control system determines that the highest "best" level is the designated resolution 180 the control system still assigns an execute scan resolution of 300 dpi by 300 dpi and signals the scanner engine to execute at that resolution 182. Thereafter the scanner and multi-function device return to idle 100.

If the user inputs a designated function as scan to file 184 control system determines the quality of the designated resolution 186. If the designated resolution is "normal" 188 the control system assigns a scan execute resolution of 600 dpi by 300 dpi and signals the scanner engine to scan at that resolution 190. If the designated resolution is the intermediate "better" quality 192 the control system assigns a scan execute resolution of 600 dpi by 600 dpi and signals the scanner engine to execute at that resolution 194. If the highest quality "best" resolution is the designated resolution 196, the control system assigns an execute scan resolution of 600 dpi by 1200 dpi and signals the scanner engine to execute at that resolution 198. Thereafter the control system and multi-function device return to idle 100.

If the user inputs a designated function as scan to e-mail 200 the control system determines the designated resolution 202. If "normal" quality is the designated resolution 204 the control system assigns a scan execute resolution of 300 dpi by 300 dpi and signals the scanner engine to execute at that resolution 206. If the intermediate "better" level is the designated resolution 208, the control system assigns a scan execute resolution of 300 dpi by 300 dpi and signals the scanner engine to execute at that resolution 210. If the highest "best" level is the designated resolution 212, the control system assigns a scan execute resolution of 600 dpi by 600 dpi and signals the scanner engine to execute at that resolution 214. Thereafter the control system and multifunction device return to idle 100.

Those who are skilled in the art will recognize that substantial variability exists in deciding the resolution choices available for users to input as designated resolutions. Various resolutions may also be assigned by the control system as the redefined execute resolutions. Greater or fewer choices may be presented to a user for designating resolutions. The number of horizontal and vertical dots per inch programmed to correspond to each of the designatable resolutions has substantial latitude with which control system programmers and multi function peripheral builders may arbitrate the precise resolution levels appropriate for different choices to be presented to a user. These resolution design choices may be guided by market considerations, as well as cost considerations. For example, higher or lower resolutions may be desired by the market place for different designatable resolution levels. Speed may be increased by offering lower resolutions for some designatable resolution options or for some functions as the redefined execute resolution. As a cost consideration, memory space may be conserved by designating lower execute resolutions for designated functions where appropriate, because scanning and fewer dots per inch will occupy less memory space.

One of the novel utilities of the quality redefinition control system of the present invention is to accommodate all of these design choices and provide programmers and builders of peripheral devices a method and apparatus with which to meet market needs, assign appropriate resolutions, increase speed and decrease cost. Accordingly, substantial variability in the options presented for designated resolutions and in the redefined execute resolutions may be programmed into the control system without departing from the scope of the present invention.

More particularly, for some functions there is an optimal resolution. For all functions there is a maximum and a minimum option for designatable resolutions. For some functions under the design choices made by some programmers executing the present invention, an optimal resolution will appear within the maximum and minimum limits of the options presented as designatable resolutions. For other functions the optimal resolution may appear outside the maximum and minimum limits.

An example of the latter is faxing. In the preferred embodiment described above, the minimum scan resolution available as a designated resolution is 600 horizontal dpi by 300 vertical dpi. The minimum limit of resolution executable by the control system in the preferred embodiment described above is 300 horizontal dpi by 300 vertical dpi. Since fax modems can not support resolutions greater than 150 dpi by 150 dpi, an optimal resolution for faxing would be 150 dpi by 150 dpi. However, this optimal resolution is outside the limits of the executable resolutions programmed into the control system in the example of the preferred embodiment outlined above. Accordingly, the redefinition according to the method of the present invention would be to move the execute resolution for faxing from whatever designated resolution has been input to the minimum executable resolution, which is 300 by 300 dpi. Accordingly, speed is increased, memory demand is decreased and efficiency increased without the burden of reprogramming the control system to accommodate a resolution outside of its executable limits, in this example, the resolution of 150 by 150 dpi.

For other functions there may be an optimal resolution that is within the range of executable resolutions, or there may be no specific optimal resolution at all. For functions such as black and white copying, photograph quality copying and scanning to e-mail, there is a range of resolutions that are all acceptable, but wherein each resolution is more or less efficient. Those skilled in the art will recognize that programming in designatable resolutions and execute resolutions is a design choice dependent on judgment as to a proper balance between resolution quality on the one hand and speed and memory conservation on the other. These choices are available without departing from the scope of the present invention.

In some circumstances the more efficient resolutions will be lower than the designated resolution. For example in black and white copying and scanning to e-mail, while there is not necessarily a specific optimal resolution, moving the designated resolution down at each resolution level may be deemed appropriate in the judgment of the control system programmer using the resolution quality redefinition system of the present invention. For example a normal print resolution for black and white copying may be moved down from 600 by 1200 dpi to 300 by 1200 dpi. For black and white copying at the intermediate "better" quality level, print resolution may be decreased from 1200 dpi by 1200 dpi to 600 dpi by 1200 dpi. Likewise at a highest "best" quality resolution quality level scan resolution may be reduced from 600 by 1200 dpi to 600 by 600 dpi and print resolution from 2400 by 1200 dpi to 1200 by 1200 dpi. The reduced resolutions are the execute resolutions. In this fashion, user choice is still accommodated by varying the black and white copying resolution quality ultimately seen by the user between low, intermediate and high resolution qualities, while at the same time reducing the execute resolutions from the designated resolutions to more efficient resolutions. Thus, increasing efficiency while still producing results that give a user meaningful control over the final output resolution is achievable with the control system of the present invention, even where there is no per se optimal resolution. This degree of selections for a user may be understood as a significant range, in which the user may make observable choices between resolutions, but within which range efficiencies may be gained with the present redefinition system.

In a similar fashion, it is inefficient to produce a result that is unacceptable, thereby forcing the user to repeat a function. This will most likely be true of photograph quality copying. There is no optimal resolution within the range of designatable resolutions. The desirable feature of presenting a user with meaningful choice among resolution qualities may be achieved by increasing a resolution to be executed from a designated resolution. For example, when a user inputs photograph quality copying as a designated function, but has left a low or "normal" quality level as the designated resolution, the control system of the present invention, as illustrated in the example above, increases scan resolution from 600 by 300 dpi to 600 by 600 dpi and increases print resolution from 600 by 1200 dpi to 1200 by 1200 dpi. Similarly, at an intermediate or "better" resolution quality for designated resolution, the control system redefines the scan resolution from 600 by 600 dpi to 600 by 1200 dpi. These particular resolutions are chosen to decrease the likelihood that a user will find a resulting printed photograph quality copy unacceptable because of poor resolution, and yet to continue to provide the user with meaningful choice of resolutions, and to maintain some efficiencies in speed and memory use considerations. Thus, a control system programmer using the method and apparatus of the present invention may exercise his judgment in balancing these considerations to choose an appropriate resolution as the redefined execute resolution from the designated resolution, without departing from the scope of the present invention.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A resolution quality redefinition control system for a multifunction scanner/printer, comprising:
    a controller controlling a plurality of functions executable by a scanner and a printer, and controlling a plurality of quality resolutions for each of said plurality of functions;
    a user input in communication with said controller to designate one of said plurality of functions for execution;
    said user input also in communication with said controller to designate one of said quality resolutions;
    each of said plurality of functions having an optimal resolution and a significant range;
    said controller defining an execute resolution for each execution of said designated one of said plurality of functions such that a higher of said plurality of quality resolutions is the execute resolution when the designated one of the plurality of quality resolutions is below the optimal resolution but within said significant range of said designated one of said plurality of functions, and a lower of said plurality of quality resolutions is the execute resolution when the designated one of the plurality of quality resolutions is above the optimal resolution but within said significant range of said designated one of said plurality of functions.

2. The system of claim 1, further comprising:
    for each said significant range for each of said plurality of functions having a maximum and a minimum,
    the maximum being the execute resolution when the optimal resolution is above said maximum and the minimum being the execute resolution when the optimal resolution is below said minimum.

3. The system of claim 1 further comprising an instruction to assign a scan execute resolution of 600 dpi by 300 dpi and to assign a print execute resolution of 300 dpi by 1200 dpi when a normal quality resolution is the designated one of the plurality of quality resolutions and a black and white copy is the designated one of the plurality of functions.

4. The system of claim 1, further comprising an instruction to assign a scan execute resolution of 600 dpi by 600 dpi and to assign a print execute resolution of 600 dpi by 1200 dpi when a better quality resolution is the designated one of the plurality of quality resolutions and a black and white copy is the designated one of the plurality of functions.

5. The system of claim 1, further including an instruction to assign a scan execute resolution of 600 dpi by 600 dpi and to assign a print execute resolution of 1200 dpi by 1200 dpi when a best quality resolution is the designated one of the plurality of quality resolutions and a black and white copy is the designated one of the plurality of functions.

6. The system of claim 1, further including an instruction to assign a scan execute resolution of 600 dpi by 600 dpi and assign a print execute resolution of 1200 dpi by 1200 dpi when a normal quality resolution is the designated one of the plurality of quality resolutions and a photograph quality copy is the designated one of the plurality of functions.

7. The system of claim 1, further including an instruction to assign a scan execute resolution of 600 dpi by 1200 dpi and assign a print execute resolution of 1200 dpi by 1200 dpi when a better quality resolution is the designated one of the plurality of quality resolutions and a photograph quality copy is the designated one of the plurality of functions.

8. The system of claim 1, further including an instruction to assign a scan execute resolution of 600 dpi by 1200 dpi and assign a print execute resolution of 2400 dpi by 1200 dpi when a best quality resolution is the designated one of the plurality of quality resolutions and a photograph quality copy is the designated one of the plurality of functions.

9. The system of claim 1, further including an instruction to assign a scan execute resolution of 300 dpi by 300 dpi when a fax is the designated one of the plurality of functions.

10. The system of claim 1, further including an instruction to assign a scan resolution of 300 dpi by 300 dpi when a normal quality resolution is the designated one of the plurality of quality resolutions and scan-to-email is the designated one of the plurality of functions.

11. The system of claim 1, further including an instruction to assign a scan execute resolution of 300 dpi by 600 dpi when a better quality resolution is the designated one of the plurality of quality resolutions and scan-to-email is the designated one of the plurality of functions.

12. The system of claim 1, further including an instruction to assign a scan execute resolution of 600 dpi by 600 dpi when a best quality resolution is the designated one of the plurality of quality resolutions and scan-to-email is the designated one of the plurality of functions.

13. A resolution quality redefinition control system for a multifunction scanner/printer, comprising:
- a controller controlling a plurality of functions executable by a scanner and a printer, and controlling a plurality of quality resolutions for each of said plurality of functions;
- a user input in communication with said controller to designate one of said plurality of functions for execution;
- said user input also in communication with said controller to designate one of said quality resolutions;
- each of said plurality of functions having an optimal resolution;
- said controller defining an execute resolution for each execution of said designated one of said plurality of functions such that a higher of said plurality of quality resolutions is the execute resolution when the designated one of the plurality of quality resolutions is below the optimal resolution but within a significant range of said designated one of said plurality of functions, and a lower of said plurality of quality resolutions is the execute resolution when the designated one of the plurality of quality resolutions is above the optimal resolution but within said significant range of said designated one of said plurality of functions, wherein:
- said higher execute resolution is a next higher quality resolution from said designated one of the plurality of resolutions; and
- said lower execute resolution is a next lowest quality resolution from said designated one of the plurality of resolutions.

14. A resolution quality redefinition control system for a multi function scanner/printer, comprising:
- a scanner engine;
- a printer engine;
- a controller having a plurality of functions executable by said scanner engine and said printer engine, and said controller having a plurality of quality resolutions for each of said scanner engine and said printer engine;
- a user input to select one of said plurality of functions;
- a user input to select one of said plurality of quality resolutions as a designated one of the plurality of quality resolutions;
- each of said plurality of functions having an optimal resolution and a significant range, each said significant range for each of said plurality of functions having a maximum and a minimum;
- said controller defining an execute resolution for each operation of said selected one of said plurality of functions such that a higher of said plurality of quality resolutions is the execute resolution when the designated one of the plurality of quality resolutions is below the optimal resolution of said selected one of said plurality of functions but within said significant range of said selected one of said plurality of functions, and a lower of said plurality of quality resolutions is the execute resolution when the designated one of the plurality of quality resolutions is above the optimal resolution of said selected one of said plurality of functions but within said significant range resolution of said selected one of said plurality of functions.

15. A multi function scanner/printer having a resolution quality redefinition control system of claim 14, further comprising:
- a scanner in operative communication with said scanner engine; and
- a printer in operative communication with said printer engine.

16. A multi function scanner/printer having a resolution quality redefinition control system of claim 15, wherein said multi function scanner/printer is a single unit.

17. A quality redefinition system for a multi-function scanner/printer, comprising:
- a scanner having a plurality of scan resolutions;
- a printer having a plurality of print resolutions;
- a controller in communication with said scanner and with said printer;
- a memory having image data storage capacity;
- a user interface by which a user inputs a designated one of a plurality of functions into said controller and inputs a designated one of said plurality of scan resolutions and inputs a designated one of said plurality of print resolutions;
- said controller directing said scanner to scan at one execute scan resolution predetermined for each combination of one of said plurality of functions with one of said plurality of scan resolutions and one of said plurality of print resolutions; and
- said controller directing said printer to print at one execute print resolution predetermined for each combination of one of said plurality of functions with one of said plurality of scan resolutions and one of said plurality of print resolutions,
- wherein one of said one execute scan resolution and said one of said execute print resolution is different than a respective one of said designated one of said plurality of scan resolutions and said designated one of said plurality of print resolutions.

18. An application specific integrated chip for controlling a multifunction scanner/printer to redefine resolution quality, comprising:
- a data structure associating each of a plurality of functions with more efficient resolutions for each of said plurality of functions at each of a plurality of designatable resolutions;
- an interface to receive a user input designated one of the plurality of functions;
- an interface to receive a user input designated one of the plurality of designatable resolutions;
- a connection compatible with a scanner engine such that scans are executable at any of the plurality of designatable resolutions;

a connection compatible with a printer engine such that printing is executable at any of the plurality of designatable resolutions;

a comparator in communication with said data structure, said interfaces and said connections, said comparator comparing said user input designated one of the plurality of designatable resolutions with said more efficient resolutions associated with said user input designated one of the plurality of functions such that the executed user input designated one of the plurality of functions will be at one of said more efficient resolutions when said one of said more efficient resolutions is associated with said user input designated one of the plurality of functions at said user input designated one of the plurality of designatable resolutions.

19. A resolution quality redefinition control system for a multifunction printer/scanner, comprising:

a controller in operative communication with a scanner engine and with a printer engine;

user input means in operative communication with said controller to designate one of a plurality of resolutions and designate one of a plurality of functions;

means for redefining said designated one of the plurality of resolutions for a designated one of the plurality of functions;

said controller signaling said scanner engine to execute the designated one of the plurality of functions at said redefined one of the plurality of resolutions and signaling said printer engine to execute the designated one of the plurality of functions at said redefined one of the plurality of resolutions, wherein said redefined one of the plurality of resolutions is a more efficient resolution than the designated one of the plurality of resolutions.

* * * * *